(12) United States Patent
Decker, Jr.

(10) Patent No.: US 8,844,664 B1
(45) Date of Patent: Sep. 30, 2014

(54) POWERED SNOWBOARD

(76) Inventor: James Edward Decker, Jr., Celina, OH (US)

( * ) Notice: Subject to any disclaimer, the term of this patent is extended or adjusted under 35 U.S.C. 154(b) by 76 days.

(21) Appl. No.: 13/231,532

(22) Filed: Sep. 13, 2011

(51) Int. Cl.
*B62M 27/02* (2006.01)

(52) U.S. Cl.
CPC .................................. *B62M 27/02* (2013.01)
USPC ........................................................ 180/181

(58) Field of Classification Search
CPC ........... A63C 5/03; A63C 5/08; B62M 27/02; B62M 2027/022
USPC ......................................... 180/181, 180, 184
See application file for complete search history.

(56) References Cited

U.S. PATENT DOCUMENTS

| | | |
|---|---|---|
| 2,450,566 A | 10/1948 | Schmid |
| 2,528,890 A | 11/1950 | Lawrence |
| 2,552,846 A | 5/1951 | Dinkins |
| 2,706,528 A | 4/1955 | Kallio |
| 2,727,581 A | 12/1955 | Wright |
| 2,741,487 A | 4/1956 | Foster |
| 2,855,059 A | 10/1958 | Sutherland |
| 2,919,142 A | 12/1959 | Winget |
| 3,338,589 A | 8/1967 | Barton et al. |
| 3,419,095 A | 12/1968 | Hood |
| 3,568,787 A | 3/1971 | Gremeret |
| 3,645,348 A | 2/1972 | Thompson |
| 3,712,396 A | 1/1973 | Ende |
| 3,750,776 A | 8/1973 | Stevenson |
| 3,791,469 A | 2/1974 | Prosser et al. |
| 3,826,323 A | 7/1974 | Mehne |
| 3,964,560 A | 6/1976 | Husted |
| 3,966,010 A | 6/1976 | Shiber |
| 4,109,739 A | 8/1978 | Husted |
| 4,307,788 A | 12/1981 | Shelton |
| 4,461,365 A | 7/1984 | Diggs |
| 4,519,470 A | 5/1985 | Allisio |
| 4,633,964 A | 1/1987 | Boyer et al. |
| 4,984,648 A * | 1/1991 | Strzok ........................... 180/181 |
| 5,127,488 A | 7/1992 | Shanahan |
| 5,305,846 A | 4/1994 | Martin |
| 5,435,408 A | 7/1995 | Sekinobu |
| 5,518,080 A | 5/1996 | Pertile |
| 5,662,186 A | 9/1997 | Welch |
| 5,975,229 A | 11/1999 | Hosoda |
| 5,984,032 A | 11/1999 | Gremillion et al. |
| 6,074,271 A | 6/2000 | Derrah |
| 6,095,547 A | 8/2000 | Vandergrift et al. |
| 6,162,115 A | 12/2000 | Schudrich |
| 6,193,003 B1 | 2/2001 | Dempster |
| 6,227,555 B1 | 5/2001 | Wang et al. |
| 6,698,540 B1 | 3/2004 | Decker |
| 6,725,959 B1 * | 4/2004 | Shea et al. ..................... 180/190 |
| D567,712 S | 4/2008 | Brazier |
| 7,434,644 B2 | 10/2008 | Wier |

(Continued)

FOREIGN PATENT DOCUMENTS

| | | |
|---|---|---|
| CA | 631338 | 11/1961 |
| WO | 2008131319 | 10/2008 |

*Primary Examiner* — J. Allen Shriver, II
*Assistant Examiner* — Brian Cassidy
(74) *Attorney, Agent, or Firm* — John V. Daniluck; Bingham Greenebaum Doll LLP

(57) ABSTRACT

An apparatus for propelling a user over a surface. In one embodiment a rear located propulsion unit is elastically linked to a forward user platform, such as a snowboard, skis, or skateboard. Preferably, the elastic interconnection includes one or more springs.

12 Claims, 11 Drawing Sheets

(56) References Cited

U.S. PATENT DOCUMENTS

| | | |
|---|---|---|
| 7,686,109 B2 | 3/2010 | Brazier |
| 7,784,571 B2 | 8/2010 | Brazier |
| 7,789,183 B2 | 9/2010 | Sadakuni et al. |
| 7,900,723 B2 | 3/2011 | Brazier |
| 7,905,310 B2 | 3/2011 | Hues |
| 8,091,671 B1 * | 1/2012 | Horsey et al. .............. 180/181 |
| 2001/0001770 A1 | 5/2001 | Spangler et al. |
| 2001/0006283 A1 | 7/2001 | Higgins et al. |
| 2002/0008361 A1 | 1/2002 | Smith |
| 2004/0154849 A1 * | 8/2004 | Fodor ........................ 180/181 |
| 2007/0205034 A1 * | 9/2007 | Wier ......................... 180/181 |
| 2008/0257628 A1 * | 10/2008 | Pitt .......................... 180/181 |
| 2011/0017539 A1 * | 1/2011 | Pitt .......................... 180/180 |

* cited by examiner

POWERED SNOWBOARD

FIELD OF THE INVENTION

Various embodiments of the present invention pertain to powered devices in which an operator platform is interconnected to a propulsion unit, and in some embodiments pertains to such devices adapted and configured for transporting the user over snow or ice.

BACKGROUND OF THE INVENTION

There are numerous designs for powered devices or "toys" for recreational activity on snow. For example, there are snowmobiles, which are a type of off-road vehicle designed and optimized for travel over snow. There are some designs that attempt to provide motorized power to a person on a pair of snow skis. There are also designs for providing power to a snow sled.

In any powered recreational device, it is useful for the device include features for control of the direction of the device. A nimble, easy to control recreational device will be both more fun and safer for the user of the device.

The capabilities and/or complexity of the control features are problems on many recreational snow devices. For example, some devices are linked to a motorized propulsion unit such that there is little or no flexibility or pivoting ability of the propulsion unit relative to the user platform. Yet other designs offer multiple degrees of freedom between the user platform and the propulsion device, but provides this in a relatively large, complex mechanism, and often this mechanism is accomplished by linkages that are substantially rigid. Yet other designs allow for pivotal movement of the user platform relative to the propulsion device, but do not provide any mechanism for restoring alignment of the two devices. What are needed are apparatus and methods which overcome these failings. The present design does this in a novel and unobvious way.

SUMMARY OF THE INVENTION

One aspect of the present invention pertains to an apparatus. Some embodiments include a platform having a front and a rear and adapted and configured for receiving thereon an operator and moving on top of a surface. Other embodiments include a propulsion unit being adapted and configured for providing a force to propel a propulsion unit and platform over a surface, the propulsion unit having a front and a rear and located behind the platform. Still other embodiments include an elastic member interconnecting the platform to the propulsion unit, wherein substantially all of the force is provided through an elastic member.

Another aspect of the present invention pertain to another apparatus Some embodiments include a platform having a front and a rear and adapted and configured for receiving thereon an operator and moving on top of a surface. Other embodiments include a propulsion unit being adapted and configured for propelling the propulsion unit and the platform over a surface, the propulsion unit having a front and a rear. Still other embodiments include an elastic member interconnecting the rear of the platform to the front of the propulsion unit, wherein the front of the propulsion unit is located at a predetermined spacing relative to the rear of the platform, and the predetermined spacing is established by the elastic member.

Yet another aspect of the present invention pertains to another apparatus. Some embodiments include a platform having a front and a rear and adapted and configured for receiving thereon an operator and moving on top of a surface. Yet other embodiments include a propulsion unit being adapted and configured for propelling the propulsion unit and the platform over a surface, the propulsion unit having a front and a rear. Still other embodiments include a pivot joint having a first component pivotally coupled to a second component; and an first elastic member having two ends with one end being coupled to one of the platform or the propulsion unit, the other end being attached to the first component; wherein the second component is attached to the other of the platform or the propulsion unit, the pivot joint being adapted and configured to permit rolling of the platform relative to the propulsion unit.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

DESCRIPTION OF THE PREFERRED EMBODIMENT

Figure 1:
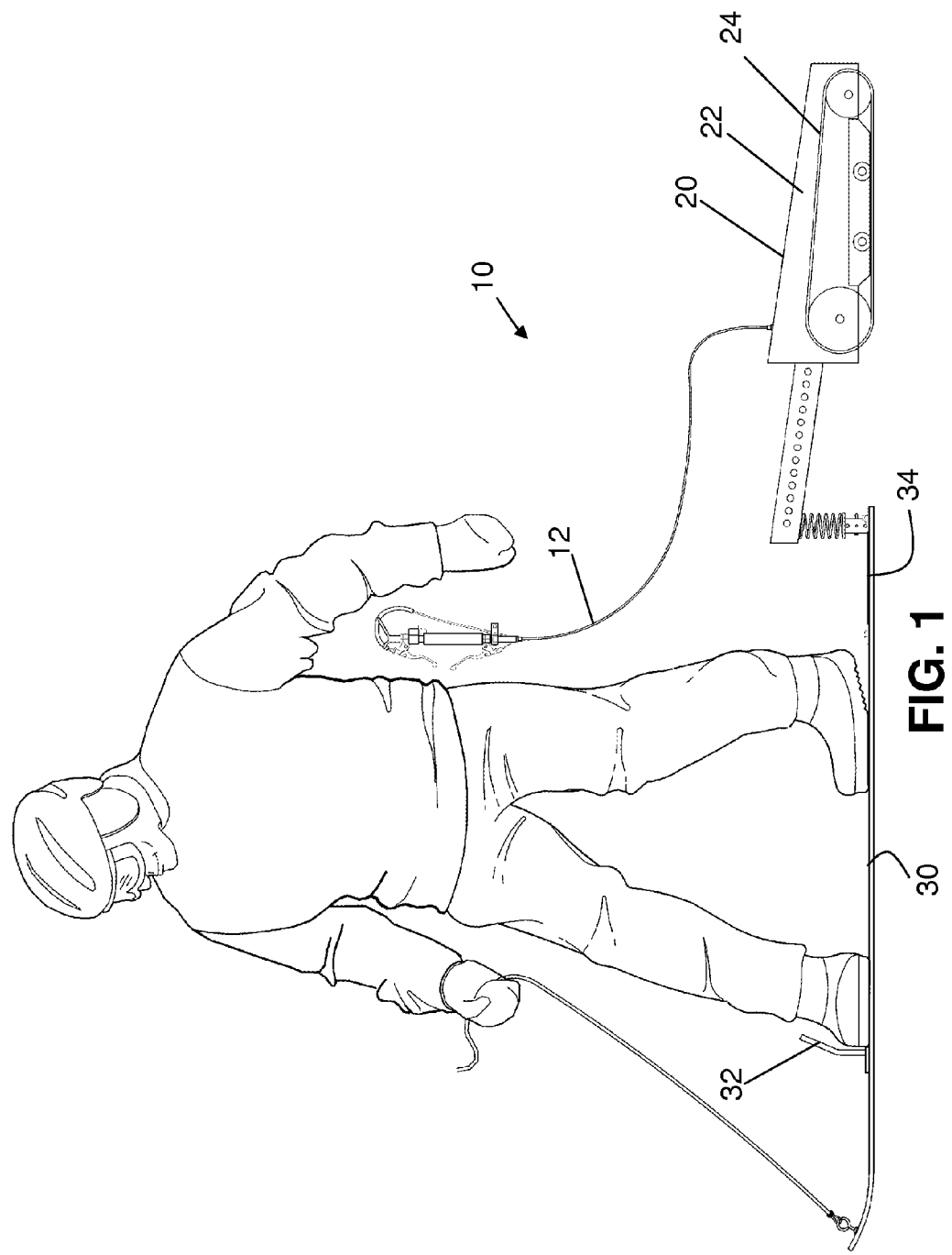
FIG. 1 is a side view of an operator on an apparatus according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims.

The use of an N-series prefix for an element number (NXX.XX) refers to an element that is the same as the non-prefixed element (XX.XX), except as shown and described thereafter. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. This description convention also applies to the use of prime ('), double prime ("), and triple prime ('") suffixed element numbers. Therefore, it is not necessary to describe the features of 20.1, 20.1', 20.1", and 20.1'" that are the same, since these common features are apparent to persons of ordinary skill in the related field of technology.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

In the discussion that follows, the x-axis is located along the longitudinal centerline of snowboard 30. The y-axis extends laterally (horizontally) relative to snowboard 30. The z-axis extends vertically relative to the x and y-axis, in a conventional right-handed system. The designations roll, pitch, and yaw represent rotations about the x, y, and z-axes, respectively.

FIG. 1 shows a user on a snow board assembly 10 according to one embodiment of the present invention. Assembly 10 includes a propulsion unit 20 that drives forward a platform 30. An interconnection assembly 40 links the front of unit 20 to the rear of platform 30. In some embodiments, interconnection unit 40 provides means for elastically driving a user platform (such means including any of the elastic transfer members discussed herein), which will be discussed in more detail. In some embodiments, the user stands on platform 30, with one foot placed behind a foot bracket 32, and the other foot placed in front of or on an attachment plate 34.

Propulsion unit 20 in one embodiment includes a motor 22 that drives a traction unit 24. Motor 22 may be of any type, including a gasoline powered engine or an electric motor, as examples. In one embodiment, traction unit 24 includes an endless loop of treads that come into contact with a surface of frozen water, such as ice or snow. The operator can provide commands to propulsion unit 20 (such as for motor speed control or power control, or motor on and off) by way of a control handle 12.

Although an assembly 10 has been shown including a snowboard 30, it is appreciated that this user platform could also be one or more skis, a skateboard (using wheels), or any other kind of user platform. Further, although propulsion unit 20 is shown with a traction device 24, it is appreciated that the motive force propelling assembly 10 forward could be provided by wheels and tires. Further, although assembly 10 shows a standing operator, other embodiments of the present invention contemplate platforms for sitting users.

Figure 2:
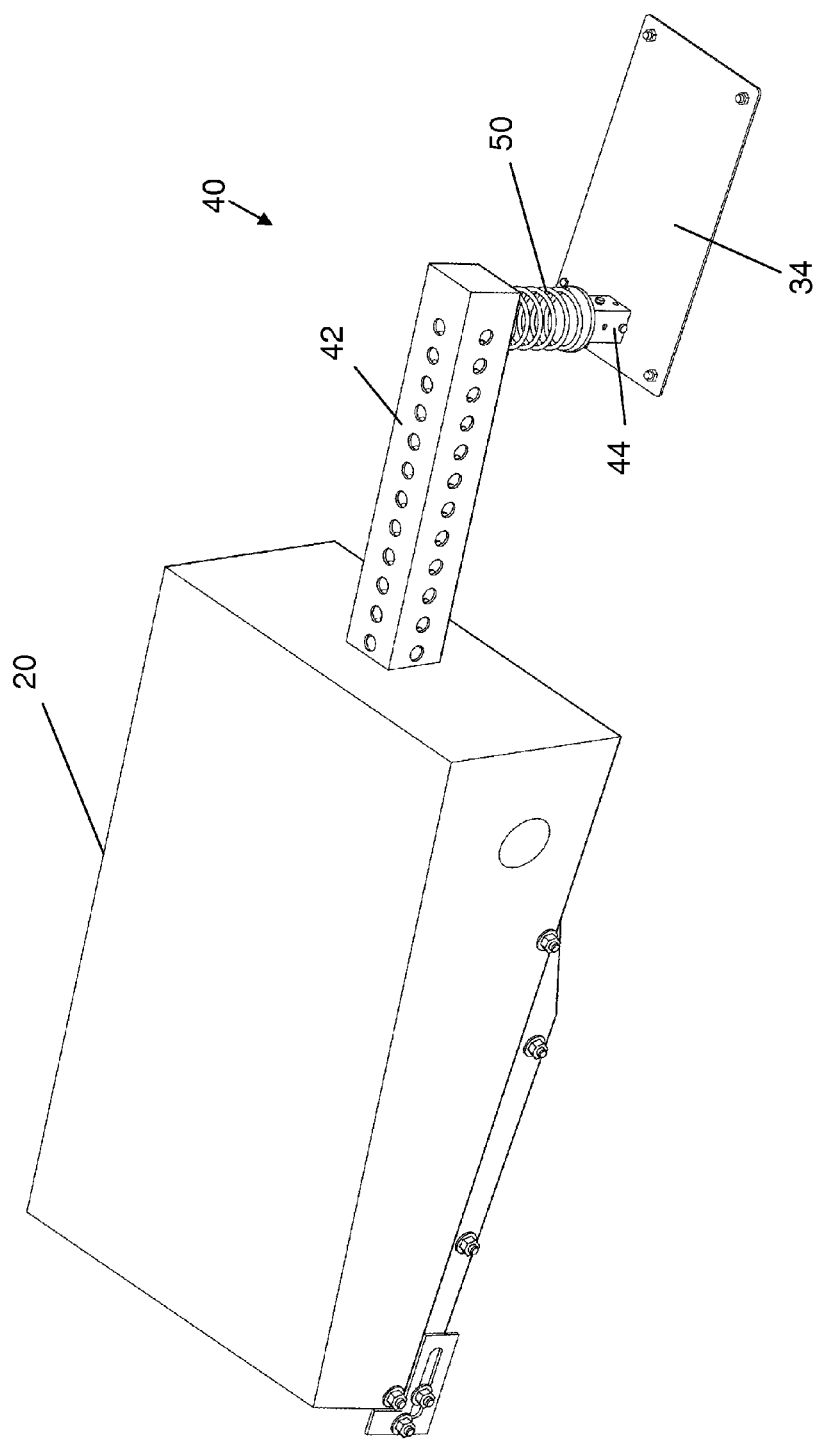
FIG. 2 is frontal, right side perspective view of a portion of the apparatus of FIG. 1 according to another embodiment of the present invention.

FIG. 2 is a perspective view of a portion of the apparatus of FIG. 1. A portion of propulsion unit 20 includes a bracket 42 that extends generally forward. Platform 30 (not shown) supports a bracket 34 that includes a bracket 44. An elastic transfer member 50 couples bracket 42 and bracket 44, and thereby couples propulsion unit 20 and platform 30. In some embodiments, elastic member 50 is adapted and configured such that it transfers substantially all of the forces and/or torques from the propulsion unit to platform 30, and also transmits substantially all of the reactive forces and/or reactive torques from platform 30 back onto transfer unit 20. In some embodiments, elastic member 50 is a mechanical spring, such as a coil spring. However, other embodiments of the invention are not so limited, and contemplate any type of spring and any type of elastic member capable of transmitting torques and/or forces back and forth between the propulsion unit and platform.

Preferably, the interconnection of propulsion unit 20 and platform 30 is adapted and configured such that at least one member of the interconnection exhibits elastic, spring-like behavior. In some embodiments, any movement of propulsion unit 20 relative to platform 30 will result in that elastic interconnecting member visibly deforming elastically in response to the applied force or torque. Such elastic members can in some embodiments be characterized as "springs," although the present invention is not so constrained. Preferably, the elastic behavior of the member is dominated by the geometry of the member and its method of attachment to unit 20 and platform 30. Preferably, this elastic behavior is not dominated by a characteristic of the material, such as Young's Modulus. As an example, in a coil spring the outer diameter, wire diameter, and coil spacing are primarily influential in establishing the softness of the spring. Likewise in a cantilever spring the cross sectional shape of the cantilever and the length of the cantilever are primarily dominant in determining the softness of the spring.

As shown in FIG. 2, one end of elastic member 50 is firmly attached to bracket 44 and the other end is attached firmly to bracket 42. Each of these attachments to brackets 44 and 42 are preferably capable of transmitting both forces and torques back and forth between unit 20 and platform 30. For example, forward motion of propulsion unit 20 will transmit a forward (x-axis) force on bracket 44, accompanied by overall bending of the spring unit (such that the top end of spring 50 is displaced forward of the bottom end of spring 50, relative to the at-rest, no load state). As another example, yawing (about the z-axis) of unit 20 will result in torsion of spring 50 about the axis of the spring. As another example, rolling of propulsion unit 20 (about the x-axis) will result in a sideways bending of elastic member 50 (relative to its at-rest position). Preferably, bracket 42 and bracket 44 are not interconnected by a rigid link.

It is to be appreciated that when propulsion unit 20 drives platform 30, that spring 50 reacts in bending as a unit, such that instead of the substantially vertical shape shown in FIG. 2, the top end of the spring would be more forward than the bottom end of the spring. In addition to this bending as a unit, it is further appreciated that in those embodiments embodying coil springs, that the state of stress across the cross section of the wire that comprises the coils is further in a state of bending, meaning that the cross section is neither in substantially pure compression, nor substantially pure tension. Instead, each portion of the wire is in bending and shear relative to the adjacent portions of the coil spring wire.

In some embodiments, elastic member 50 further establishes a spacing of unit 20 relative to platform 30. Referring again to FIG. 2, it can be seen that a disconnection and removal of spring 50 establishes unit 20 and platform 30 as independent free bodies. However, the coupling of spring 50 to brackets 42 and 44 establishes a position of platform 30 relative to unit 20 along the x, y, and z axes. Preferably, elastic member 50 couples the front of unit 20 to the rear of platform 30, although it is to be understood that yet other variations are contemplated. For example, bracket 44 and attachment plate 34 can also couple to the middle or front of platform 30. Likewise, bracket 42 can attach to the middle or rear of propulsion unit 20.

Figure 3:
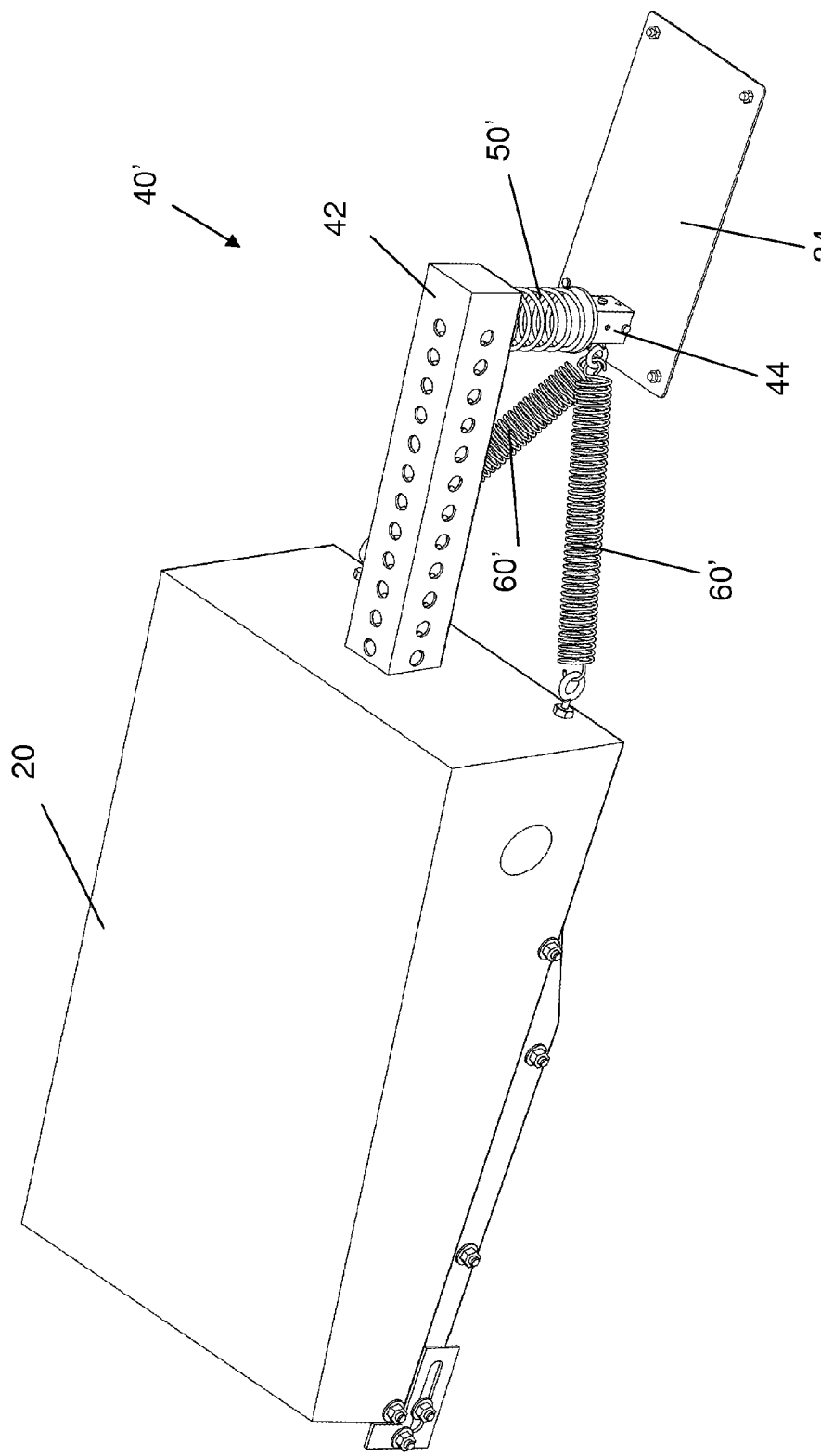
FIG. 3 is frontal, right side perspective view of an apparatus according to another embodiment of the present invention.

FIG. 3 depicts an interconnection assembly 40' that includes a pair of elastic alignment members 60' interconnecting propulsion unit 20 and platform 30. In some embodiments, elastic members 60' are adapted and configured (especially with regards to wire diameter, number of coils per inch, and other spring characteristics) to operate primarily in tension between unit 20 and platform 30. In such embodiments, compression of an elastic member 60' results in elastic buckling of the spring (or in the case of a coil spring with significant residual compression, a complete seating of the coils). As shown in FIG. 3, elastic alignment members 60' operate in tension during yawing and pitching of platform 30 relative to unit 20.

Figure 4:
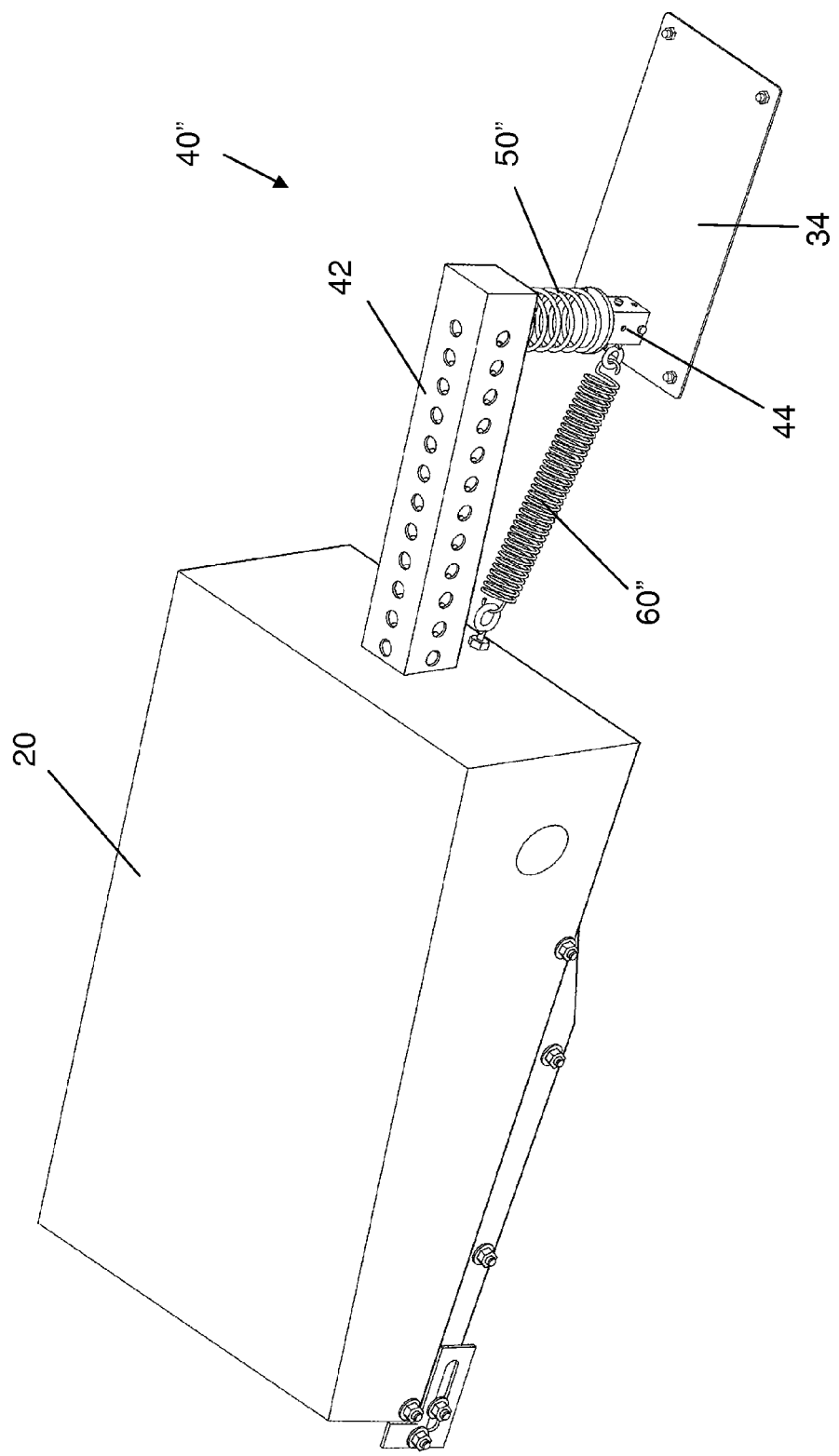
FIG. 4 is frontal, right side perspective view of an apparatus according to another embodiment of the present invention.

It can also be seen that in some embodiments bracket 42 may include a plurality of attachment holes that are adapted and configured for changing the interconnection location of spring 50 to bracket 42, along the x-axis. Further, it can be seen that in some embodiments bracket 44 includes a plurality of attachment holes for altering the height of the interconnection between spring 50 and bracket 44 in the z direction FIG. 4 shows an interconnection unit 40' similar to assembly 40, except as shown and described. Interconnection assembly 40" includes an elastic transfer member 50" that interconnects brackets 42 and 44. A single elastic alignment member 60" is aligned substantially along the x-axis, and interconnects unit 20 and platform 30. Elastic alignment member 60" acts substantially in tension only, and generally exhibits elastic buckling in compression. Elastic member 60" in some embodiments provide a restoring and aligning load (or torque) during pitching of platform 30 relative to unit 20.

Figure 5:
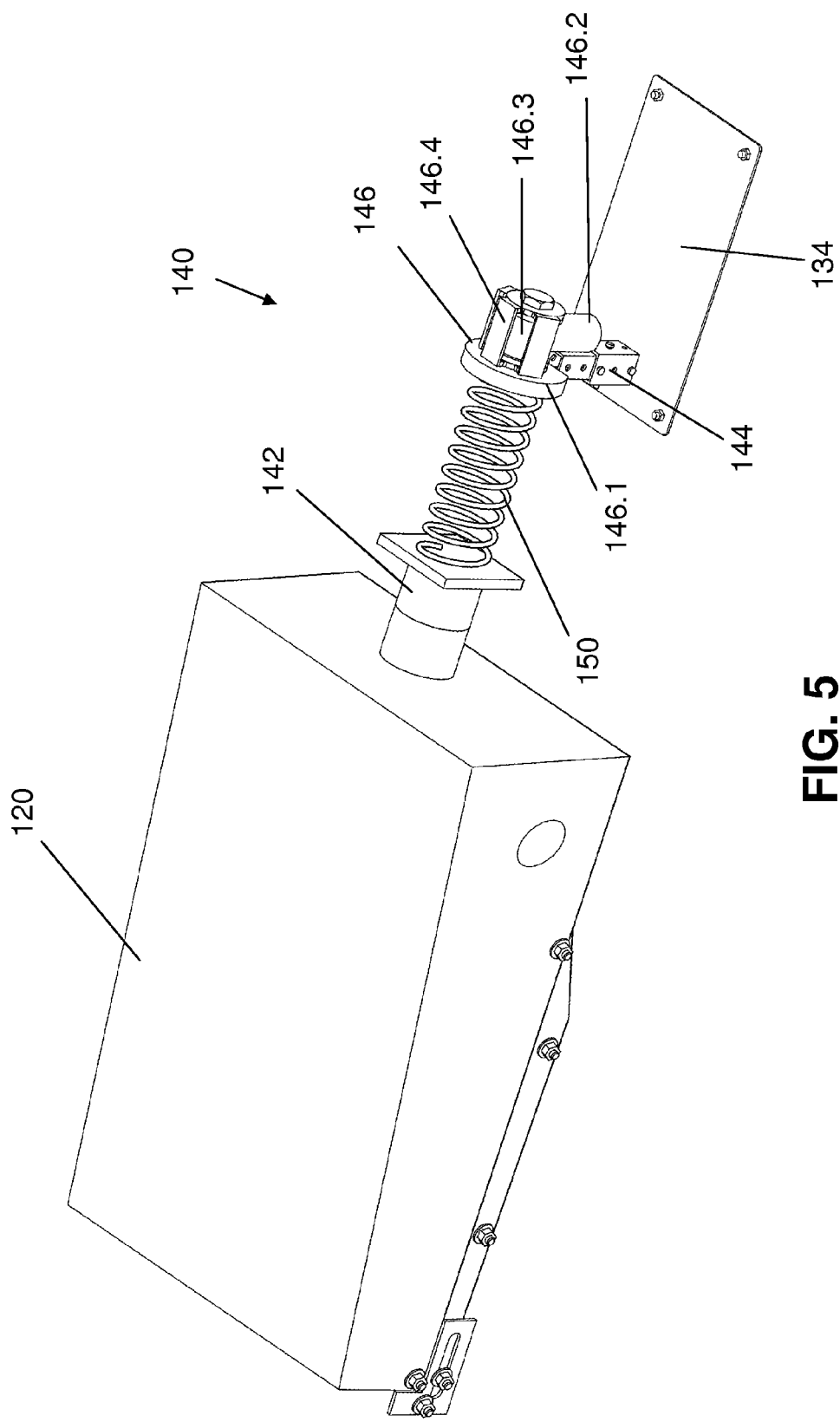
FIG. 5 is frontal, right side perspective view of an apparatus according to another embodiment of the present invention.

FIG. 5 shows an interconnection assembly 140 according to another embodiment of the present invention. Assembly 140 includes an elastic transfer member 150 interconnecting on one end by a bracket 142 to unit 120, and on the other end by a bracket assembly 144 to platform 130. As will be shown and discussed, bracket assembly 144 includes a swivel joint that alters the manner in which rolling torques are transmitted by member 150. Further, although a swiveling joint is shown in use with a longitudinally (x-axis) oriented spring, it is to be appreciated that a similar swiveling joint may also be applied with vertically aligned springs (such as in assembly 40). Further, although the swiveling features are shown and described with regards to the attachment of the elastic transfer member to the platform, such a swivel joint could also be applied at the connection of the elastic transfer member to the propulsion unit.

FIG. 5 shows a platform bracket assembly 144 that includes a pair of predrilled, rectangular members that extend vertically upwards from platform 134. As discussed previously, the upper (and inner) rectangular member can be moved vertically relative to the lower (and outer) rectangular member, with their relative positions established by a plurality of locking pins.

In one embodiment, a first swiveling member 146.2 is rigidly coupled to the smaller (inner) rectangular post, this attachment being at the bottom end of swiveling member 146.2. The upper end of swiveling member 146.2 is a substantially round (or spherical) end that is captured within a plurality of guide members 146.4 that extend from a platform 146.1 of swivel joint 146. The cylindrical (or spherical) end 146.3 is free to swivel (in the rolling direction) within the trapping guide members 146.4. The bracket 146.1 of swivel joint 146 is also attached to one end of elastic transfer member 150. The other end of elastic transfer member 150 is coupled to a bracket 142 extending from propulsion unit 120.

Swivel joint 146 is adapted and configured to provide at least limited isolation of unit 120 relative to platform 130 during rolling (about the x-axis). As platform 130 rolls, attachment bracket 144 and inner swivel joint attachment 146.2 likewise roll with platform 130. Inner swivel joint attachment 146.3 likewise rolls with outer member 146.2 since, preferably, member 146.3 and 146.2 are different ends of a unitary structure.

However, inner member 146.3 is free to swivel within the confines (or pocket) defined by outer aft swivel joint member 146.4. Therefore, any rolling motion of platform 130 relative to swivel joint aft attachment members 146.1 and 146.4 is not transmitted via inner members 146.2 and 146.3, except by friction. Because of this swiveling effect, rolling of platform 130 relative to unit 120 does not result in a torsional wind-up of spring 150, at least for a predetermined range of angular motion. It is appreciated that lower inner member 146.2 cannot swivel (roll) past the endmost edges of the pocket defined by members 146.4. However, it is further appreciated that swivel joint 146 does not interfere with elastic movement of spring 150 during pitching or yawing, or for any translational motions.

Preferably, the aftmost end of elastic member 150 is attached to a bracket 142 which couples the end of member 150 to unit 120. However, it is further appreciated that swivel joint 146 can be located in place of attachment bracket 142. Further, it is to be appreciated that a pair of swiveling attachment brackets 146 can be attached at both the fore and aft ends of member 150, so as to provide an increased range of roll angle that does not torsionally wind-up elastic member 150.

It is to be appreciated that when propulsion unit 120 drives platform 130, that spring 150 reacts in compression as a unit, such that instead of the at rest length shown in FIG. 2, the two ends of the spring would be closer and together. In addition to this compression as a unit, it is further appreciated that in those embodiments embodying coil springs, that the state of stress across the cross section of the wire that comprises the coils is further in a state of bending, meaning that the cross section is neither in substantially pure compression, nor substantially pure tension. Instead, each portion of the wire is in bending and shear relative to the adjacent portions of the coil spring wire.

The use of some embodiments of a swivel joint 146 permits the characteristics of spring 150 to be chosen based on bending characteristics of the spring (such as the bending encountered during yawing and pitching) with less regard for torsional stiffness of the spring, since relative torsional movement is substantially eliminated within a predetermined angular range of motion.

In some embodiments, elastic transfer member 150 is a steel coil spring having a free length of about 4 inches, an outer diameter of about 2½ inches, produced from wire having a diameter of about 3/10 of an inch, and having a spring characteristic of about 270 pounds per inch. In other embodiments, elastic transfer member 150 is a steel coil spring having a free length of about 5 inches, an outer diameter of about 3⅛ inches, produced from wire having a diameter of about ⅜ of an inch, and having a spring characteristic of about 260 pounds per inch. In yet other embodiments, elastic transfer member 150 is a steel coil spring having a free length of about 5 inches, an outer diameter of about 3 inches, produced from wire having a diameter of about ⅜ of an inch, and having a spring characteristic of about 310 pounds per inch. Further still, elastic transfer member 150 can be a steel coil spring having a free length of about 5 inches, an outer diameter of about 2⅝ inches, produced from wire having a diameter of about ⅜ of an inch, and having a spring characteristic of about 390 pounds per inch. In some embodiments, elastic transfer member 150 is a steel coil spring having a free length of about 4 inches, an outer diameter of about 2 inches, produced from wire having a diameter of about 3/10 of an inch, and having a spring characteristic of about 470 pounds per inch.

Figure 6A:
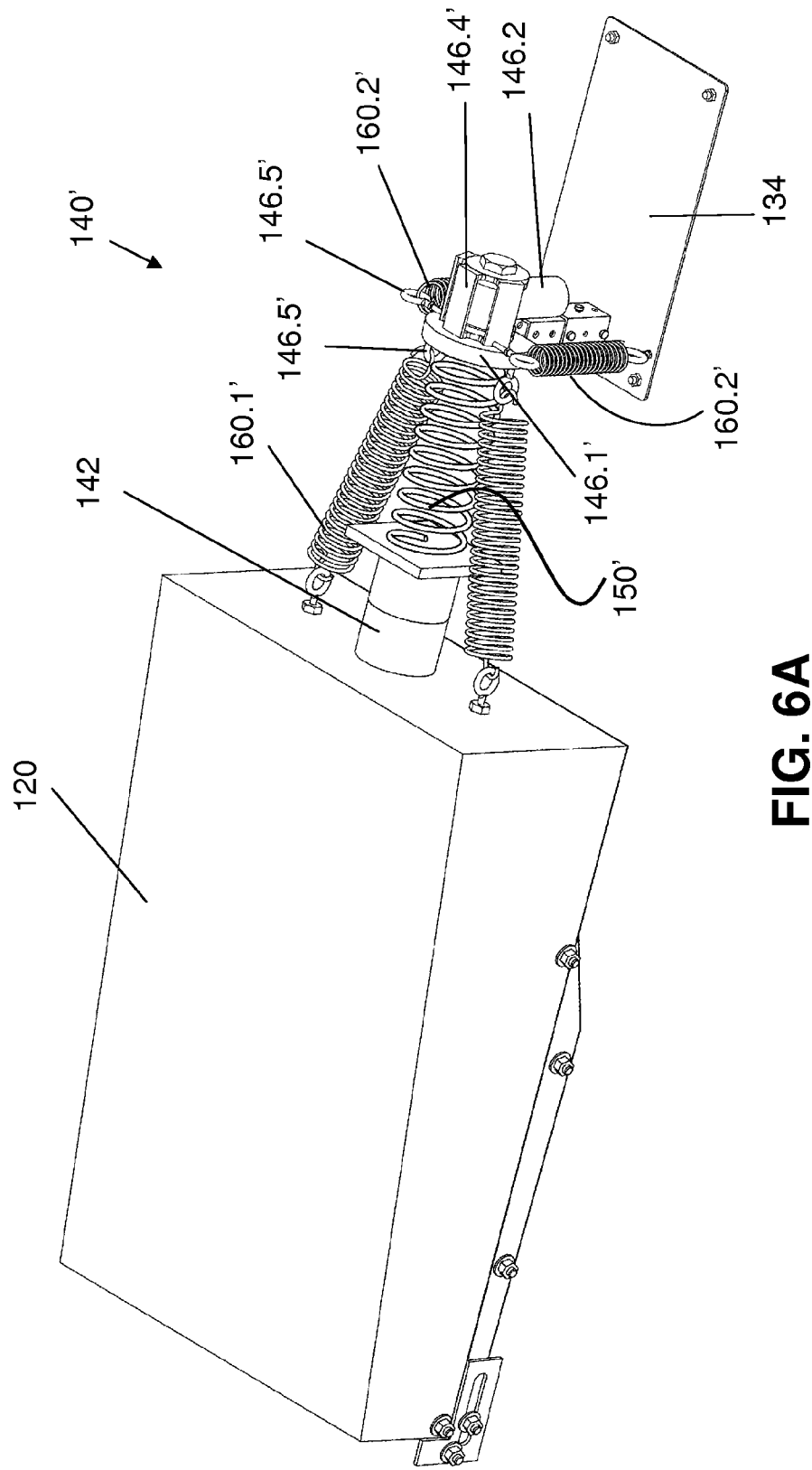
FIG. 6A is frontal, right side perspective view of an apparatus according to another embodiment of the present invention.
Figure 6B:
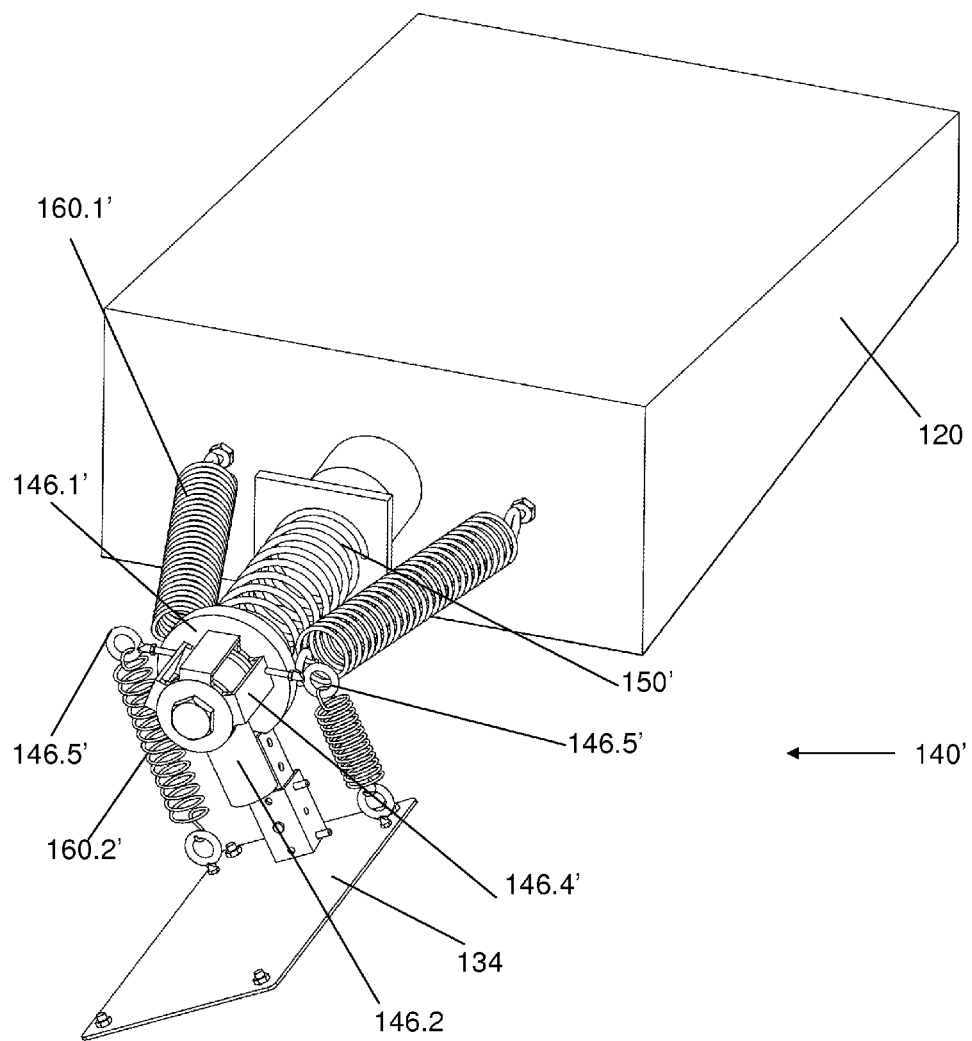
FIG. 6B is a frontal and left side perspective view of the apparatus of FIG. 6A during a turning maneuver.

FIGS. 6A and 6B show a modified apparatus 140' in which a swivel joint 146' provides resistance to rolling by one or more alignment springs 160'. Referring to FIG. 6A, it can be seen that swivel bracket members 146.1' and/or 146.4' include one or more eyelets 146.5. A pair of eyelets 146.5' extend laterally, each coupling an elastic alignment member 160.2' between the eyelet and platform 134 (which includes a corresponding means for attaching the other end of the alignment springs 160.2'). Another pair of eyelets 146.5' extend aft of bracket 146.1', and couple to the forward ends of a pair of springs 160.1'. The other end of these springs 160.1' are coupled by another pair of eyelets 146.5' to unit 120. Although an interconnection of coil spring ends within corresponding eyelets has been shown and described, it is understood that the present invention is not so limited, and includes any method of coupling any type of elastic member to the aforementioned brackets and unit 120.

Referring to FIG. 6B, the action of forward springs 160.2' can be seen. FIG. 6B shows a platform 130 that has a positive roll angle about the x-axis. In so doing, since bracket 134 is free between predetermined limits to swivel relative to outer swivel bracket features 146.1' and 146.4', spring 150' develops little or no torsional wind-up. Therefore, as the right side of platform attachment plate 134 rotates about the axis of swivel joint 146, the forward right side spring 160.2' is extended in tension. Conversely, the forward left side spring 160.2' is compressed. The extension of the forward right side spring 160.2' therefore applies a restoring torque that attempts to realign platform 130 and unit 120 back to their at-rest positions. In some embodiments, the forward left side spring 160.2' (in compression as shown in FIG. 6B) contributes little or nothing to this restoring torque, especially in those embodiments in which the left side spring is in a state of tension when platform 130 and 120 are in their at-rest positions.

FIG. 6B also illustrates the effect of rolling on the rear alignment strings 160.1". During a maneuver that involves relative rolling of platform 130 and unit 130, rearward left and right alignment members 160.1' are relatively undisturbed for motion within the predetermined range of free swiveling. However, once inner and lower member 146.2 swivels to a point where it contacts outer swiveling member 146.4', any subsequent rolling motion results in torsional rotation of spring attachment member 146.1'. When that happens, both springs 160.1' will be stretched in tension as the distance between that spring's eyelets increases. Further, as discussed previously, relative torsional movement is induced into elastic transfer member 150'.

Figure 7B:
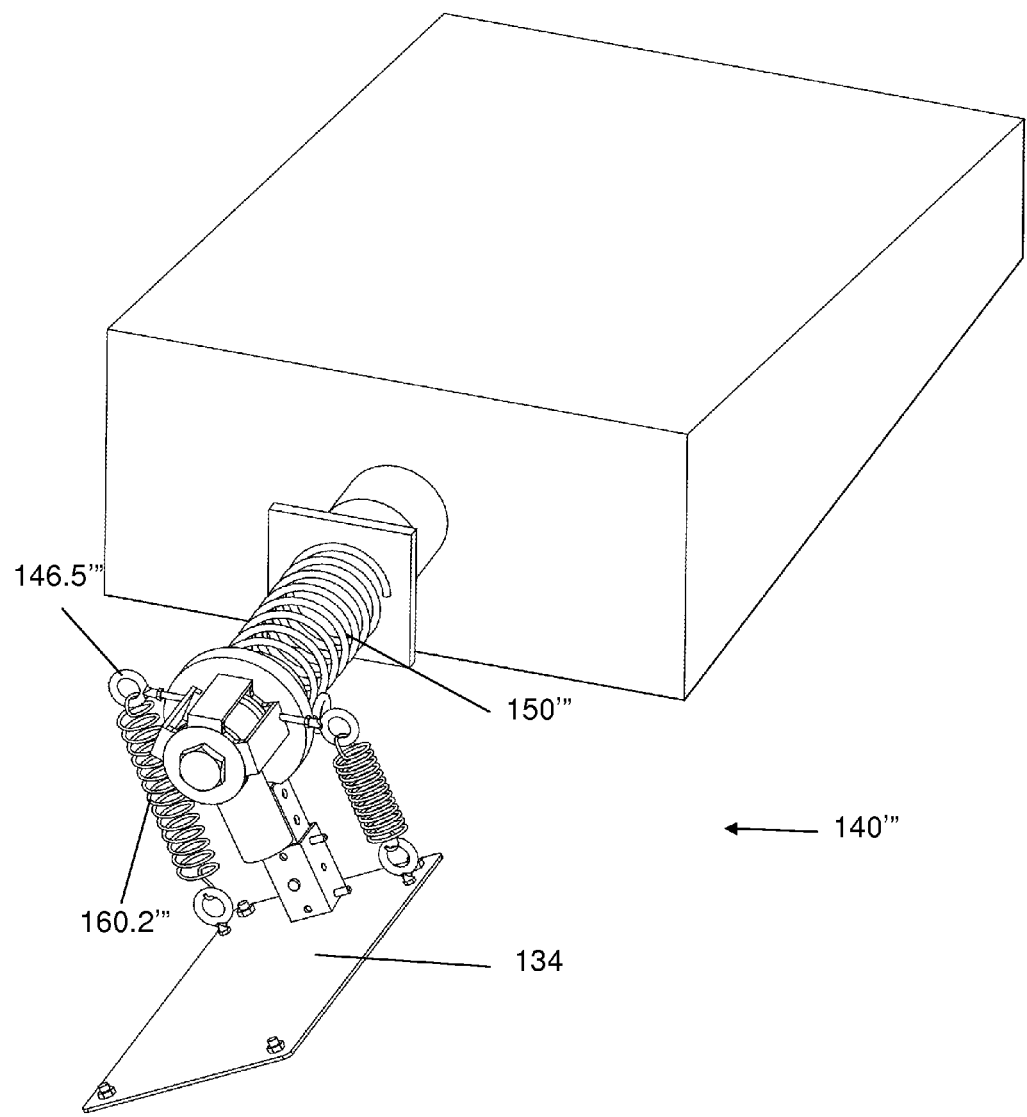
FIG. 7B is a frontal and left side perspective view of an apparatus according to another embodiment of the present invention during a turning maneuver.
Figure 7A:
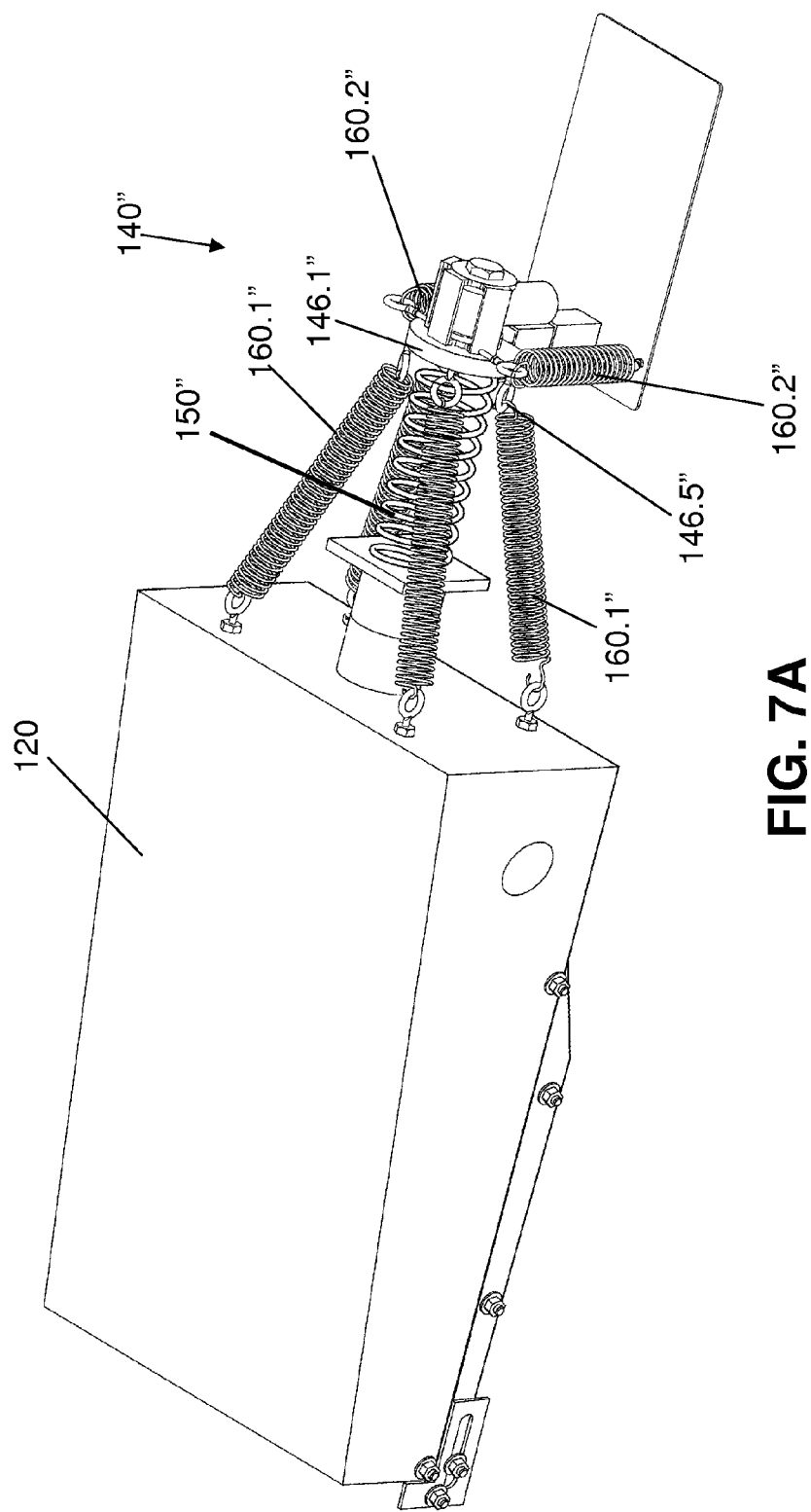
FIG. 7A is frontal, right side perspective view of an apparatus according to another embodiment of the present invention.

FIGS. 7A and 7B show additional modifications expressed as inner connection assemblies 140" and 140''', respectively. Referring to FIG. 7A, it can be seen that in some embodiments of the present invention there is both an upper set of right and left aft alignment members 160.1", as well as a corresponding lower set of right and left aft alignment members 160.1" In such embodiments, the additional resistance to rolling established by contact between the inner and outer members of swivel joint 146" is increased because of the increased number of springs.

FIG. 7B shows yet another embodiment as apparatus 140'''. In this embodiment, there are no aft alignment members 160.1. Resistance to rolling motion is provided by forward right and left members 160.2''' (for swiveling within the predetermined range of motion), and torsion of spring 150''' (for rolling motion after the swivel joint has reached its predetermined limit of relative angular movement).

Figure 8:
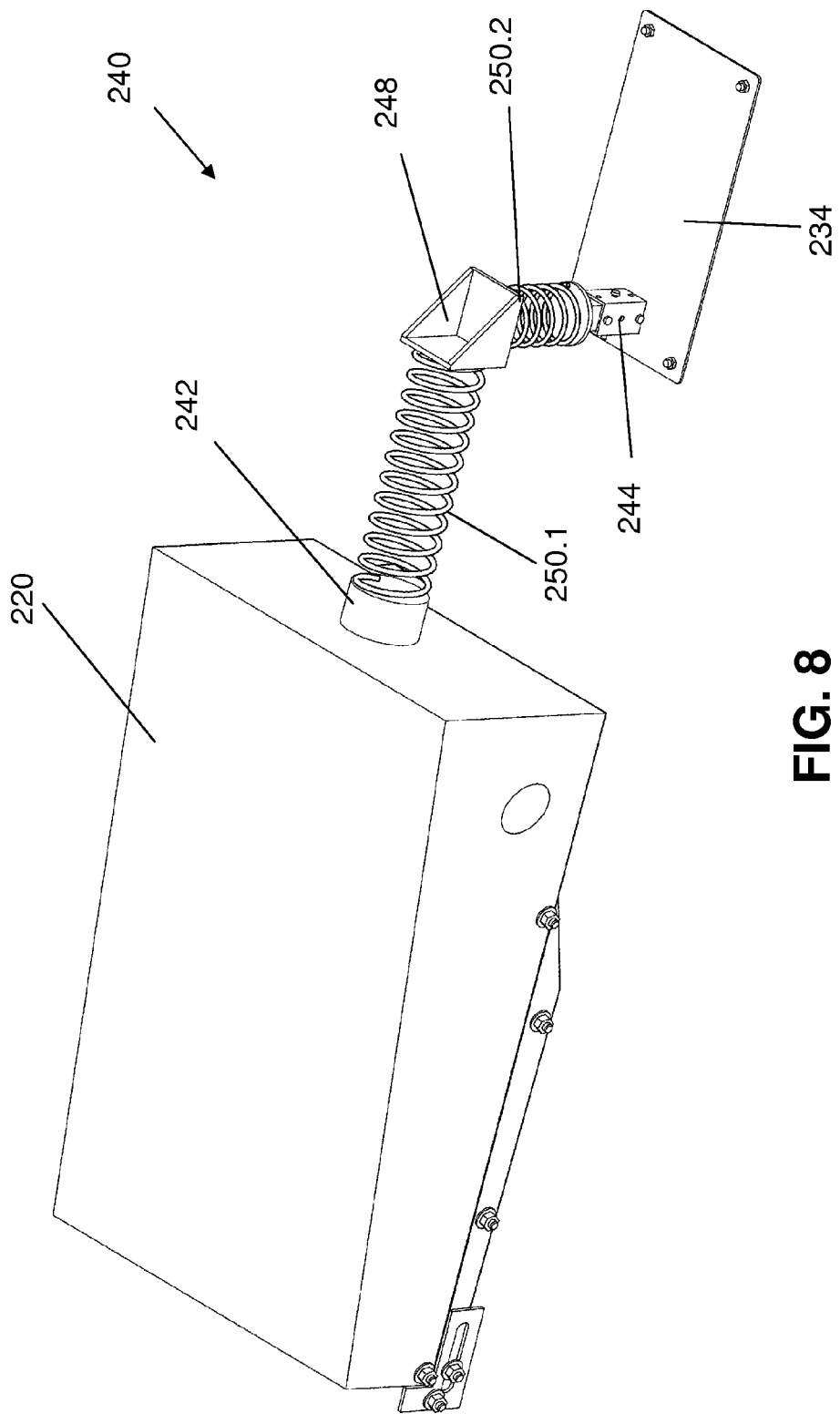
FIG. 8 is frontal, right side perspective view of an apparatus according to another embodiment of the present invention.

FIG. 8 shows an interconnection assembly 240 that links together a propulsion unit 220 and a platform 230. Interconnection assembly 240 includes a substantially horizontally arranged aft elastic transfer member 250.1 that interconnects through an angle bracket 248 to a forward, substantially vertical transfer member 250.2. As discussed with regards to previous embodiments, all of the motive force from propulsion unit 220 is applied serially through transfer member 250.1 and 250.2 to platform 230. Further, the relative spacing of platform 230 relative to unit 220 is established in part and separately by each of the elastic transfer members 250.1 and 250.2. It is understood that the various embodiments shown herein can be recombined in various ways. As one example, interconnection assembly 240 can include a swivel joint 246 located between spring 250.2 and 250.1. Likewise, the swivel joint can also be located between spring 250.1 and unit 220.

Figure 9:
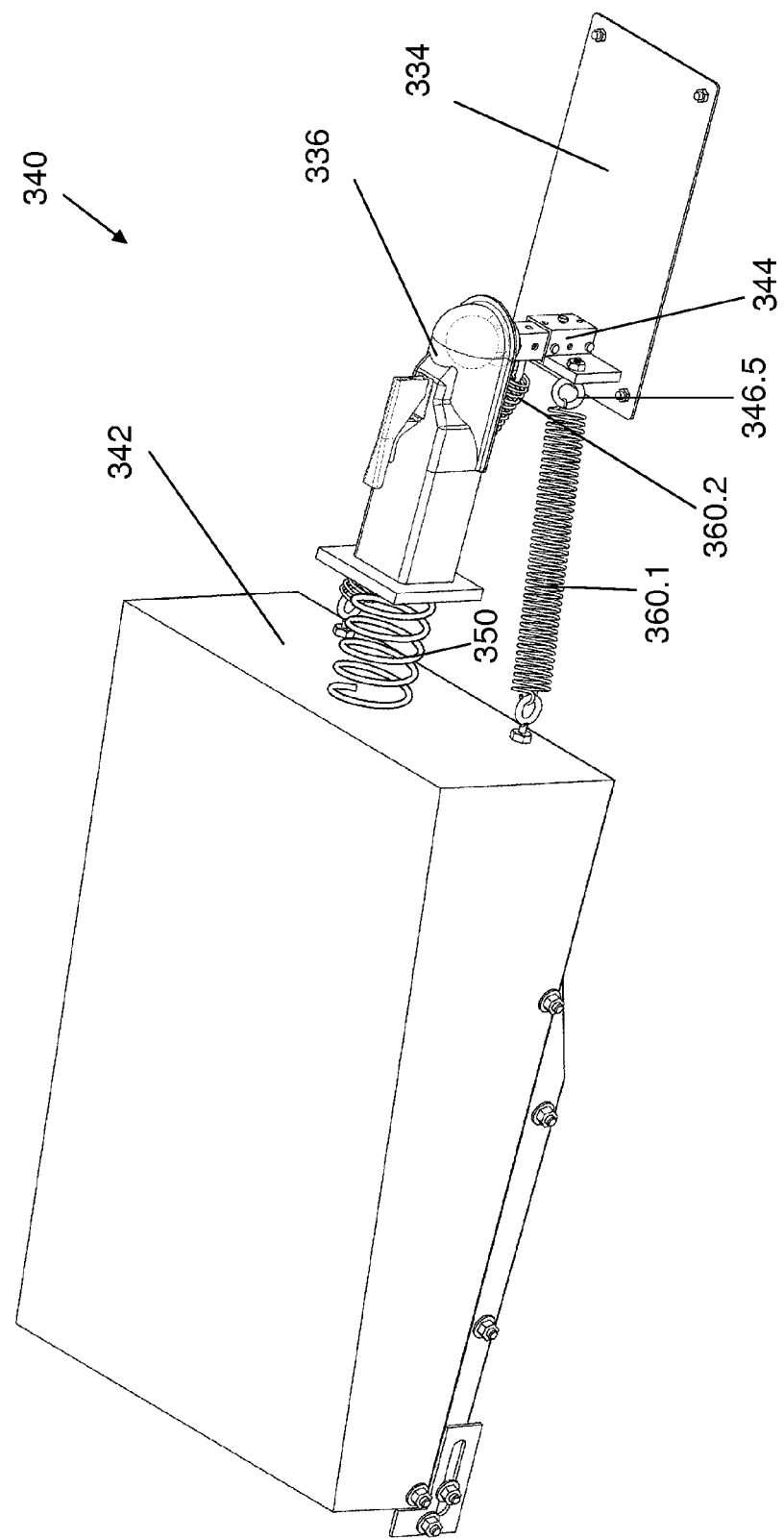
FIG. 9 is frontal, right side perspective view of an apparatus according to another embodiment of the present invention.

FIG. 9 shows an interconnection assembly 340 that includes a ball hitch mechanism 336. Elastic transfer member 350 interconnects at one end to hitch assembly 336, and at the other end to propulsion unit 320. It is understood that a ball hitch mechanism 336, especially including those with quick release features, can be incorporated into any of the previously discussed embodiments.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

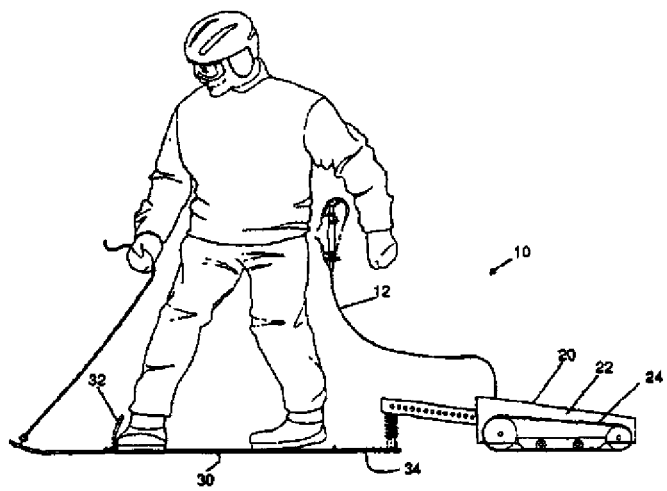

What is claimed is:

1. An apparatus comprising:
   a platform having a front and a rear and adapted and configured for receiving thereon an operator and moving on top of frozen water;
   a propulsion unit being adapted and configured for providing a force to propel said propulsion unit and said platform over frozen water, said propulsion unit having a front and a rear, said propulsion unit being located behind said platform; and
   one or more elastic members interconnecting said platform to said propulsion unit, wherein all of the force from said propulsion unit to propel said platform is provided through said one or more elastic members, wherein said platform is not interconnected to said propulsion unit by a pivotal joint that is independent of the interconnection of said platform to said propulsion unit by said elastic member.

2. The apparatus of claim 1 wherein said platform has a first central axis, said propulsion unit has a second central axis, said elastic member has two ends, and one end of said member interconnects to the rear of said platform along the first axis, and the other end of said member interconnects to the front of said propulsion unit along the second axis.

3. The apparatus of claim 1 wherein said elastic member is a coil spring.

4. The apparatus of claim 1 wherein said coil spring is substantially vertical.

5. The apparatus of claim 1 wherein said platform is a snowboard.

6. The apparatus of claim 1 wherein said platform includes at least one ski.

7. The apparatus of claim 1 wherein the elasticity of said elastic member is provided substantially by bending of said elastic member.

8. The apparatus of claim 1 wherein the elasticity of said elastic member is not provided substantially by only one of compression or tension of the material of said elastic member.

9. An apparatus comprising:
a platform having a front and a rear along an axis and adapted and configured for receiving thereon an operator and moving on top of frozen water;
a propulsion unit being adapted and configured for propelling said propulsion unit and said platform over frozen water, said propulsion unit having a front and a rear; and
an elastic member interconnecting the rear of said platform to the front of said propulsion unit, wherein said elastic member establishes a predetermined spacing along the axis between the front of said propulsion unit and the rear of said platform when said platform and said propulsion unit are at rest, and removal of said elastic member permits free movement along the axis between the front of said propulsion unit and the rear of said platform.

10. The apparatus of claim 9 wherein said elastic member is adapted and configured to permit pitching of said platform relative to said propulsion unit.

11. The apparatus of claim 9 wherein said elastic member is a coil spring.

12. The apparatus of claim 11 wherein said coil spring is substantially vertical.

* * * * *

UNITED STATES PATENT AND TRADEMARK OFFICE
CERTIFICATE OF CORRECTION

PATENT NO.        : 8,844,664 B1
APPLICATION NO.   : 13/231532
DATED             : September 30, 2014
INVENTOR(S)       : James E. Decker, Jr.

It is certified that error appears in the above-identified patent and that said Letters Patent is hereby corrected as shown below:

Delete the title page and substitute the attached title page therefor.

In the Claims

Col. 9, line 13 - Col. 10, line 23, please add the following claims:

4. The apparatus of claim 3 wherein said coil spring is substantially horizontal.

6. The apparatus of claim 3 wherein said coil spring is a first coil spring, and which further comprises a second coil spring, and said first coil spring is one of substantially vertical or substantially horizontal, and said second coil spring is the other of substantially vertical or substantially horizontal.

7. The apparatus of claim 1 wherein the front of said propulsion unit is located a predetermined distance behind the rear of said platform, and the predetermined distance is established by said elastic member.

14. The apparatus of claim 13 wherein said elastic member is adapted and configured to permit rolling of said platform relative to said propulsion unit.

17. The apparatus of claim 16 wherein said coil spring is substantially horizontal.

19. The apparatus of claim 16 wherein said coil spring is a first coil spring, and which further comprises a second coil spring, and said first coil spring is one of substantially vertical or substantially horizontal, and said second coil spring is the other of substantially vertical or substantially horizontal.

28. The apparatus of claim 16 wherein said coil spring is a first coil spring, and wherein said elastic member further includes a second coil spring interconnecting the rear of said platform to the front of said propulsion unit.

Signed and Sealed this
Sixth Day of January, 2015

Michelle K. Lee
*Deputy Director of the United States Patent and Trademark Office*

29. The apparatus of claim 3 wherein said coil spring is a first coil spring, and wherein said elastic member further includes a second coil spring interconnecting the rear of said platform to the front of said propulsion unit.

(12) United States Patent
Decker, Jr.

(10) Patent No.: US 8,844,664 B1
(45) Date of Patent: Sep. 30, 2014

(54) POWERED SNOWBOARD

(76) Inventor: James Edward Decker, Jr., Celina, OH (US)

(*) Notice: Subject to any disclaimer, the term of this patent is extended or adjusted under 35 U.S.C. 154(b) by 76 days.

(21) Appl. No.: 13/231,532

(22) Filed: Sep. 13, 2011

(51) Int. Cl.
B62M 27/02 (2006.01)

(52) U.S. Cl.
CPC .................................. B62M 27/02 (2013.01)
USPC ........................................................ 180/181

(58) Field of Classification Search
CPC ........... A63C 5/03; A63C 5/08; B62M 27/02; B62M 2027/022
USPC ................................... 180/181, 180, 184
See application file for complete search history.

(56) References Cited

U.S. PATENT DOCUMENTS

| | | |
|---|---|---|
| 2,450,566 A | 10/1948 | Schmid |
| 2,528,890 A | 11/1950 | Lawrence |
| 2,552,846 A | 5/1951 | Dinkins |
| 2,706,528 A | 4/1955 | Kallio |
| 2,727,581 A | 12/1955 | Wright |
| 2,741,487 A | 4/1956 | Foster |
| 2,855,059 A | 10/1958 | Sutherland |
| 2,919,142 A | 12/1959 | Winget |
| 3,338,589 A | 8/1967 | Barton et al. |
| 3,419,095 A | 12/1968 | Hood |
| 3,568,787 A | 3/1971 | Gremeret |
| 3,645,348 A | 2/1972 | Thompson |
| 3,712,396 A | 1/1973 | Ende |
| 3,750,776 A | 8/1973 | Stevenson |
| 3,791,469 A | 2/1974 | Prosser et al. |
| 3,826,323 A | 7/1974 | Mehne |
| 3,964,560 A | 6/1976 | Husted |
| 3,966,010 A | 6/1976 | Shiber |
| 4,109,739 A | 8/1978 | Husted |
| 4,307,788 A | 12/1981 | Shelton |
| 4,461,365 A | 7/1984 | Diggs |
| 4,519,470 A | 5/1985 | Allisio |
| 4,633,964 A | 1/1987 | Boyer et al. |
| 4,984,648 A * | 1/1991 | Strzok ..................... 180/181 |
| 5,127,488 A | 7/1992 | Shanahan |
| 5,305,846 A | 4/1994 | Martin |
| 5,435,408 A | 7/1995 | Sekinobu |
| 5,518,080 A | 5/1996 | Pertile |
| 5,662,186 A | 9/1997 | Welch |
| 5,975,229 A | 11/1999 | Hosoda |
| 5,984,032 A | 11/1999 | Gremillion et al. |
| 6,074,271 A | 6/2000 | Derrah |
| 6,095,547 A | 8/2000 | Vandergrift et al. |
| 6,162,115 A | 12/2000 | Schudrich |
| 6,193,003 B1 | 2/2001 | Dempster |
| 6,227,555 B1 | 5/2001 | Wang et al. |
| 6,698,540 B1 | 3/2004 | Decker |
| 6,725,959 B1 * | 4/2004 | Shea et al. ............... 180/190 |
| D567,712 S | 4/2008 | Brazier |
| 7,434,644 B2 | 10/2008 | Wier |

(Continued)

FOREIGN PATENT DOCUMENTS

| | | |
|---|---|---|
| CA | 631338 | 11/1961 |
| WO | 2008131319 | 10/2008 |

Primary Examiner — J. Allen Shriver, II
Assistant Examiner — Brian Cassidy
(74) Attorney, Agent, or Firm — John V. Daniluck; Bingham Greenebaum Doll LLP

(57) ABSTRACT

An apparatus for propelling a user over a surface. In one embodiment a rear located propulsion unit is elastically linked to a forward user platform, such as a snowboard, skis, or skateboard. Preferably, the elastic interconnection includes one or more springs.

20 Claims, 11 Drawing Sheets